US007971250B2

(12) United States Patent
Walter (10) Patent No.: US 7,971,250 B2
(45) Date of Patent: Jun. 28, 2011

(54) SYSTEM AND METHOD FOR PROVIDING DATA CONTENT ANALYSIS IN A LOCAL AREA NETWORK (75) Inventor: Edward A. Walter, Boerne, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 802 days.

(21) Appl. No.: 10/682,366

(22) Filed: Oct. 8, 2003

(65) Prior Publication Data
US 2005/0080888 A1 Apr. 14, 2005

(51) Int. Cl.
G06F 11/00 (2006.01)
G06F 12/14 (2006.01)
G06F 12/16 (2006.01)
G08B 23/00 (2006.01)

(52) U.S. Cl. .............................. 726/23; 726/22; 726/24
(58) Field of Classification Search .................. 709/223, 709/224; 713/188; 726/23, 24
See application file for complete search history.

(56) References Cited

U.S. PATENT DOCUMENTS

| 4,292,465 | A | * | 9/1981 | Wilson et al. | 178/3 |
| 5,483,467 | A | * | 1/1996 | Krupka et al. | 709/200 |
| 5,550,816 | A | | 8/1996 | Hardwick et al. | |
| 5,987,430 | A | * | 11/1999 | Van Horne et al. | 705/34 |
| 6,324,575 | B1 | * | 11/2001 | Jain et al. | 709/221 |
| 6,487,664 | B1 | | 11/2002 | Kellum | |
| 2002/0069356 | A1 | | 6/2002 | Kim | |
| 2002/0069370 | A1 | | 6/2002 | Mack | |
| 2002/0083344 | A1 | * | 6/2002 | Vairavan | 713/201 |
| 2002/0108059 | A1 | | 8/2002 | Canion et al. | |
| 2002/0120741 | A1 | * | 8/2002 | Webb et al. | 709/225 |
| 2003/0035430 | A1 | * | 2/2003 | Islam et al. | 370/401 |
| 2003/0110229 | A1 | | 6/2003 | Kulig et al. | |
| 2003/0110395 | A1 | | 6/2003 | Presotto et al. | |
| 2005/0050362 | A1 | * | 3/2005 | Peles | 713/201 |

OTHER PUBLICATIONS

"Fortigate 1000: Real0time Content Security for Large Enterprises", http:llwww.fortinet.comldoclFGTlOOODS.pdf, dated Jan. 2003, four pages.*
"1997 Press Release: Trend Micro's Virus Protection Added to Missive Intelligent Messaging Switch", http://www.trendmicro.com/en/about/nes/pr/archive/1997/pro092497.htm, dated Sep. 24, 1997, three pages.
"Fortigate 1000: Real0time Content Security for Large Enterprises", http://www.fortinet.com/doc/FGT1000DS.pdf, dated Jan. 2003, four pages.
"Network WorldFusion: Users Exploit LAN Switch Security Features", http://www.nwfusion.com/cgi-bin/mailto/x.cgo, dated Mar. 17, 2003, four pages.
"Nortel Touts Secure Wi-Fi for Enterprise", http://news.zdnet.co.uk/cgi-bin/uk/printerfriendly.cgi?id=2132681&tid=411, dated 2002, two pages.
Sections 10.1 and 7.12 from IEEE Standard 802.1D—2004 (IEEE Standard for Local and metropolitan area networks—Media Access Control (MAC) Bridges).

* cited by examiner

Primary Examiner — Nasser Moazzami
Assistant Examiner — Randal D Moran
(74) Attorney, Agent, or Firm — Hanley, Flight & Zimmerman (57) ABSTRACT A system and method for providing data content analysis is disclosed. The system includes an intelligent switch in a local area network, where the intelligent switch has content analysis applications stored therein and is configured to apply one or more content analysis applications on a port-by-port basis. The method includes remotely updating one or more content analysis applications at intelligent switches of subscriber networks.

23 Claims, 5 Drawing Sheets

SYSTEM AND METHOD FOR PROVIDING DATA CONTENT ANALYSIS IN A LOCAL AREA NETWORK

FIELD OF THE INVENTION

The present invention relates to data content analysis in a local area network. More particularly, the present invention relates to a system and method for applying applications relating to analyzing and filtering data content at an intelligent switch within a local area network and managing content analysis and filtering applications from a remotely located managed service provider network.

BACKGROUND

Figure 1:
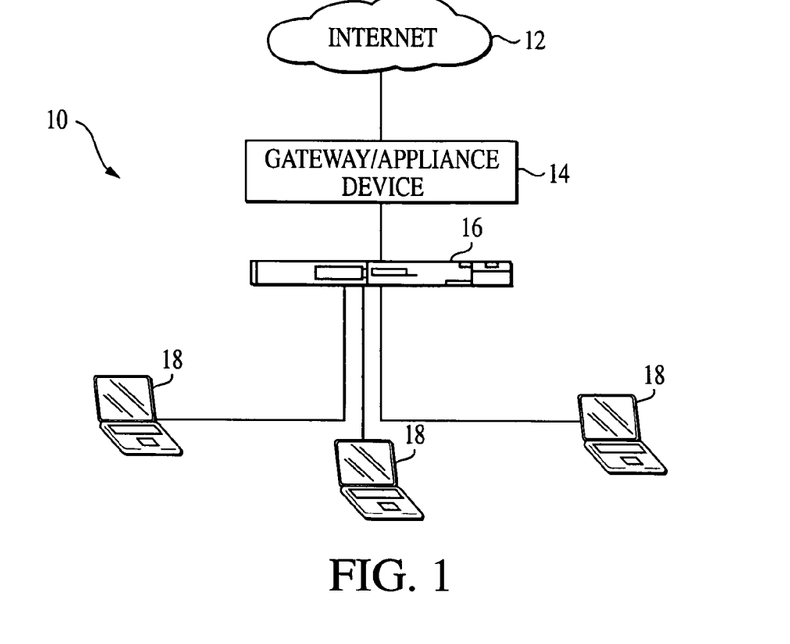
FIG. 1 illustrates a local area network.

Networked systems generally operate with various forms of anti-virus protection and content filtering to protect against unauthorized access, intrusions, or attacks on the network. Protective measures against different types of intrusion on a network typically take the form of a gateway appliance that is positioned to intercede between a local area network and outside networks (e.g. at the point where a local area network connects to the Internet). One or more content analysis applications, such as anti-virus and filtering applications, may reside on the gateway appliance. As shown in FIG. 1, in the gateway approach the information received from the Internet 12 would be intercepted at the gateway 14 before being routed at a switch 16 inside the network to the appropriate destination device 8 in the network 10. All content filtering, virus checking, and intrusion detection would be performed in the gateway device 14. Although hypothetically effective against all unwanted intrusions, viruses and content originating outside of the local area network, this in-line method of content analysis has some potential drawbacks. Because all information sent to the local area network 10 must pass through the gateway appliance 14, a bottleneck may develop at the gateway if the gateway is configured to perform anti-virus, content filtering or intrusion detection function for the network, thus degrading system performance. Also, information passed between devices within the network would not be subject to the protection provided by the gateway appliance.

Another current approach for anti-virus, content filtering, or intrusion detection requires distributing software applications to each work station or other device 18 within the local area network 10. In some ways, this solution improves over the in-line gateway appliance solution in that all data traffic, whether originating outside the network through an Internet connection or consisting of data passed between devices within the local area network, will be within the reach of the software agents on the work stations. Several disadvantages, however, also accompany the distributed software agent approach. For example, maintaining a uniform and updated set of software agents on each and every device within a network can be challenging and resource intensive. Individual work station users may inadvertently fail to properly use the software resources even if those resources are complete and current. Even more troubling is the potential for an individual work station user to circumvent the protections of software agents on the user's network device.

Accordingly, there is a need for an effective and efficient way to provide and maintain data content analysis applications in local area networks.

BRIEF SUMMARY

In order to address the deficiencies in the prior art, a system and method for providing data content analysis in a local area network is discussed below. According to a first aspect of the invention, a method is disclosed for content analysis of data received at a local area network from an external communications network. The method includes receiving unanalyzed content at a local area network and communicating the unanalyzed content to a switch in the local area network. At the switch, the unanalyzed content is analyzed and analyzed data is routed from the switch to an appropriate destination device in the local area network. In different embodiments, the unanalyzed data may be received via a router or gateway at the local area network, or directly at the intelligent switch from the external communications network without an intervening gateway device. The content analysis may be performed on a port-by-port basis at the intelligent switch. The content analysis may include anti-virus, content filtering, intrusion detection and other content analysis applications in various embodiments.

In another aspect of the invention, a method of managing content analysis for a local area network from a remotely located managed server provider network, unaffiliated with the local area network, is disclosed. In one embodiment, a communication link is established between a switch in the local area network and the managed service provider network via an external communications network. Port configuration instructions for individually or collectively configuring each port of the switch are transmitted from the managed service provider network to the switch, where the port configuration instructions include instructions to configure at least one port at the switch to implement at least one content analysis function. In other embodiments, the method may include receiving a content analysis software update at the managed service provider network and then transmitting the content analysis software update to the switch. Also, the managed service provider network may monitor the performance of the content analysis function or functions operative on the switch in the local area network.

According to another aspect of the invention, a local area network intelligent switch with content analysis capabilities includes a plurality of ports configured for communication with a respective external device. Each of the ports includes an interface connection adapted for connecting with a communication line of an external device, a processor in communication with the interface connection with the interface connection, a memory in communication with the processor, and an application buffer in communication with the processor and the memory, where the application buffer contains logic operative on the processor to analyze the content of information passing between the external device and the port. A communication bus in the intelligent switch communicates with each of the ports and is adapted to carry information between the ports.

In yet another aspect of the invention, a method of providing content analysis policy to a plurality of networks is provided. The method includes establishing a communication link between a switch in each of a plurality of subscriber networks and an application management appliance of a managed service provider network via an external communications network. The switch in each of the plurality of subscriber networks receives at least one of instructions and update information for a content analysis application from the application management appliance. The content analysis instructions or update information may relate to anti-virus, content filtering, intrusion detection, network security, or other content analysis applications to be stored and implemented at each switch. The managed service provider network also gathers performance metrics on the content analysis application from each of the plurality of subscriber networks.

DETAILED DESCRIPTION OF THE DRAWINGS AND THE PRESENTLY PREFERRED EMBODIMENTS

Figure 2:
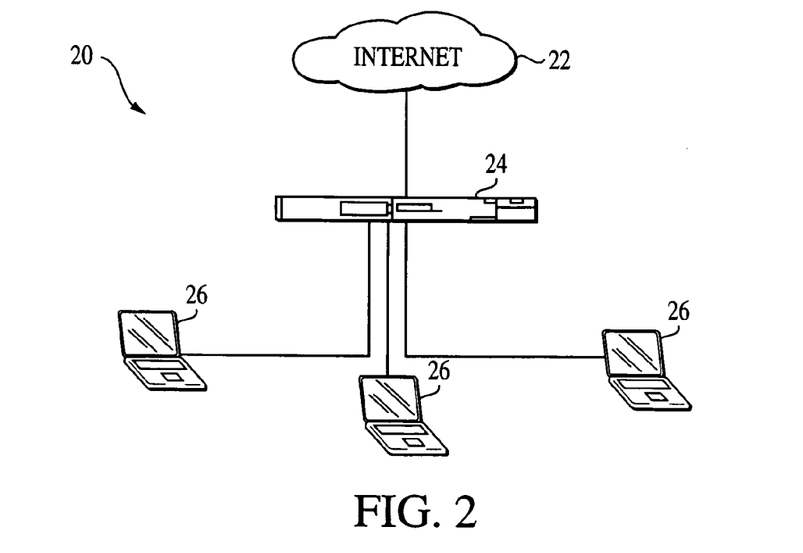
FIG. 2 illustrates an alternative configuration of the local area network of FIG. 1.

An embodiment of a local area network 20 in which improved content analysis, such as anti-virus/content filtering applications, may be implemented is shown in FIG. 2. The local area network 20 is connected to an external communications network 22, such as the Internet. Although standard devices and applications such as routers and firewalls may also be included in the network 20, such devices and applications are omitted from FIG. 2 for clarity. An intelligent switching device 24 receives unfiltered data from the external communications network. The intelligent switching device 24 has individual ports connected to various devices 26 (e.g., any of a number of known electronic devices such as workstations, servers and etc.) within the network 20. The connections between the external communications network 22 and the various other components of the local area network 20 may be implemented via any of a number of known transmission mediums, such as wireline, fiber optic, or wireless connections. In another embodiment, a gateway device such as described with reference to FIG. 1 may be positioned between the external network 22 and the intelligent switch 24. In this alternative embodiment, the content analysis functions discussed below may all reside on the intelligent switch or may be split up between the gateway device and the intelligent switch.

Figure 3:
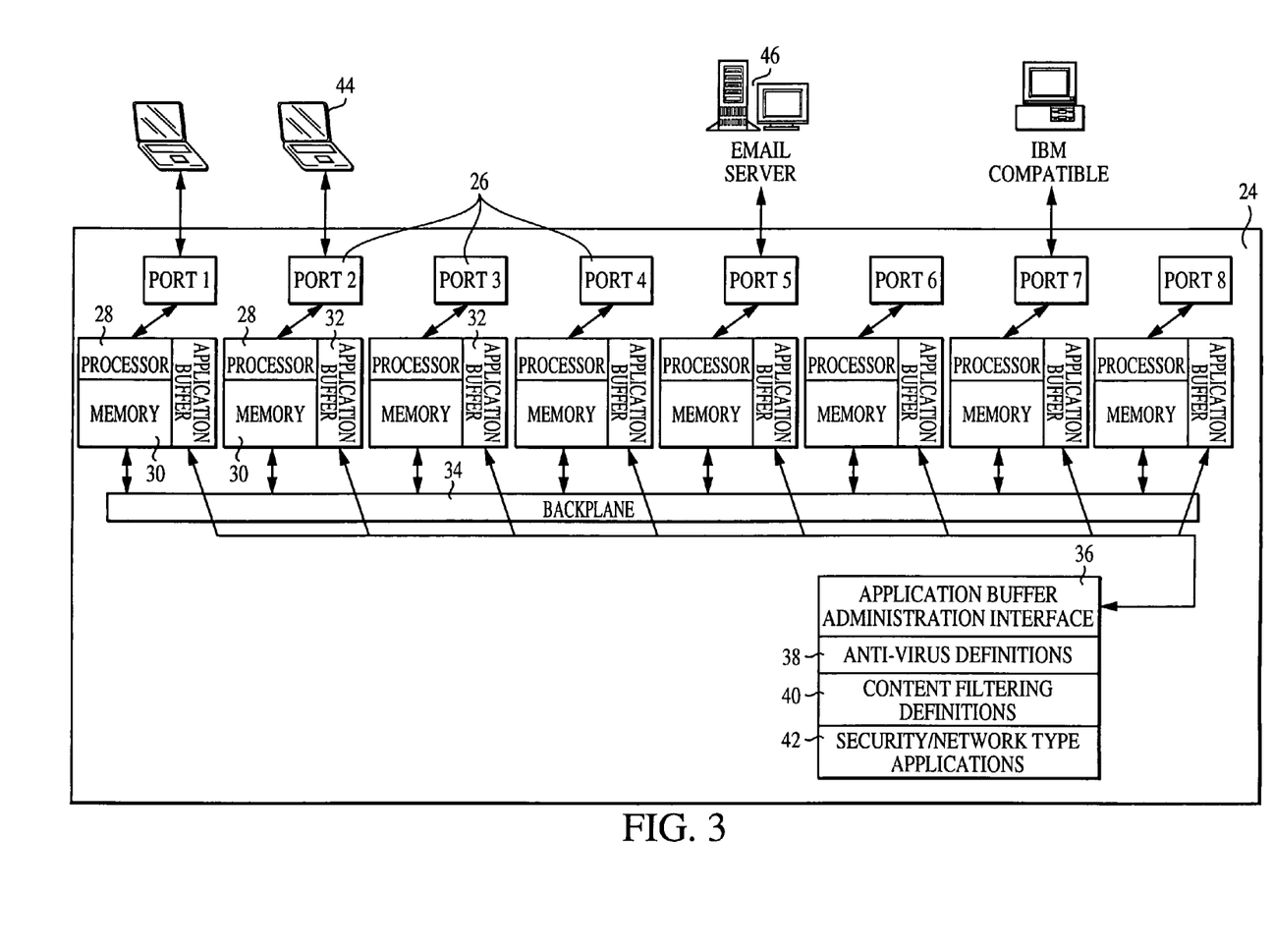
FIG. 3 illustrates an embodiment of an enterprise LAN (local area network) intelligent switch having individual port scanning capabilities.

FIG. 3 illustrates an embodiment of a suitable intelligent switch 24, such as an enterprise LAN intelligent switch, for use in the network 20 of FIG. 2. The intelligent switch 24 is configured for implementing the content analysis functions, such as filtering, anti-virus and intrusion detection functions, at the intelligent switch level. The intelligent switch 24 includes multiple ports 26 each configured for connection to a device in the local area network through communication lines with standard interfaces, such as registered jacks (e.g. RJ-45), commonly used for network connections. In the embodiment of FIG. 3, each port 26 of the intelligent switch 24 is associated with a dedicated processor 28 that is associated with a respective memory 30 and an application buffer 32. The processor and memory may be any of a number of commonly available types of microprocessors and memory components such as chip sets available from Intel Corporation and Advanced Micro Devices, Inc. The application buffer 32 may be a portion of the memory 30 or a separate memory device capable of holding logic and other software applications executable by the processor on information arriving at the port or leaving through the port. Each port 26, through its respective processor 28, memory 30 and application buffer 32 arrangement, is in communication with a backplane 34 permitting communication between each of the ports of the intelligent switch 24.

An application buffer administration interface 36 in the intelligent switch communicates with the application buffer 32 of each of the ports so that logic and software applications dedicated to one or more ports may be distributed from a central point in the intelligent switch. The application buffer administration interface 36 may contain anti-virus definitions 38, content filter definitions 40, and other security/network types of applications 42 that may be used at one or more of the ports 26 in the intelligent switch. Each port 26 may receive at its application buffer 32 the same set of logic for content analysis, filtering and anti-virus applications. Alternatively, each of the ports 26 may be provisioned with customized sets of logic suitable for the specific type of device (e.g. workstation 44, server 46, etc.) connected with that port. In this manner, each of the application buffers 32 associated with the processor 28 and memory 30 of a specific port can have different applications loaded than other ports in the intelligent switch 24.

Alternatively, the intelligent switch 24 may include groups of ports associated with a processor, memory, and application buffer combination. For example, in a intelligent switch with eight ports, pairs of ports could be connected to individual processing functions rather than each individual port possessing its own discrete processing module. The intelligent switch 24 may be fabricated in various arrangements of port to processing module combinations in accordance with the traffic requirements of the particular local area network. The intelligent switch 24 may be fabricated with any number of ports, for example in groups of commonly available port numbers such as 8, 16, 24 or more. In order to facilitate distribution and updating of applications to the intelligent switch generally, and to specify ports, the application buffer administration interface 36 for the intelligent switch is accessible to authorized entities via communication through any port in the intelligent switch. Authorized entities may include the network administrator for the local area network, and anyone authorized by the network administrator, such as a third party managed service provider as described in greater detail below. Although the intelligent switch 24 may be a single hardware structure, in other embodiments the switch may be a networked group of discrete processors and memory devices, or various combinations thereof.

An advantage of placing one or more content analysis applications at the intelligent switch level, where each port may autonomously analyze and take action on data flow to and from that specific port, is that the existing LAN infrastructure, in this instance the intelligent switch, can be used. The port-by-port scanning available at the intelligent switch 24 provides efficient content filtering, anti-virus performance, and other content analysis type features without slowing down network performance, as can happen at a gateway due to bottleneck issues, or requiring a gateway having expensive, high-performance processors capable of handling the content analysis functions simultaneously for all traffic leaving or entering the entire local area network. Standard, currently available processors and memory hardware may instead be used at each port. Because network users cannot generally control or manipulate the functions embedded in the intelligent switch for a local area network, the intelligent switch 24 provides protection against inadvertent or intentional circumvention of anti-virus applications and other local area network-based filtering policies. Another advantage provided by the intelligent switch 24 with individually configurable port functionality is the ability for a network operator to maintain and update the software from a central location, rather than having to individually update and enter data at all of the devices in the network.

Figure 4:
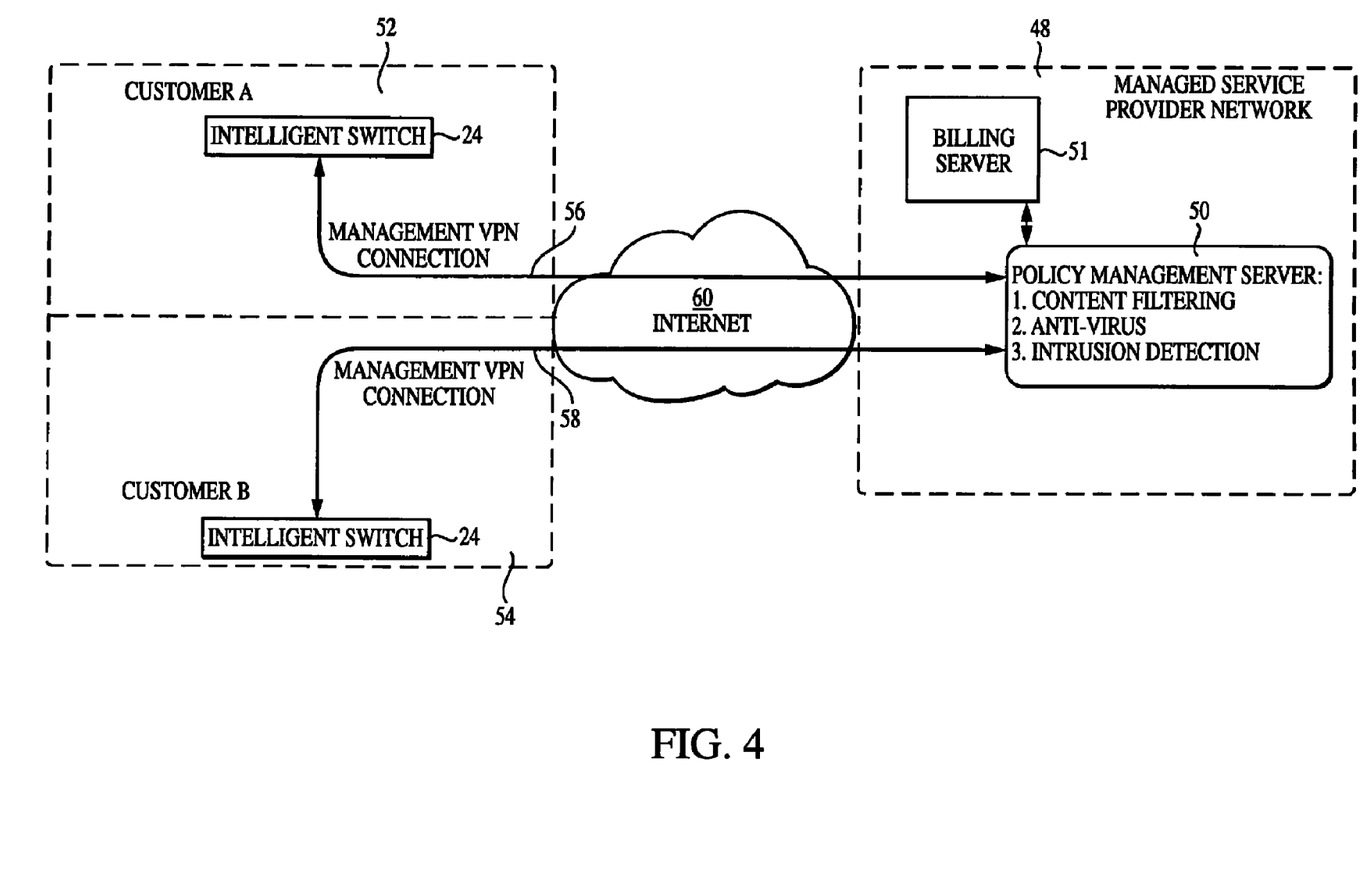
FIG. 4 illustrates a distribution network for providing remote configuration and updating of anti-virus/content filtering applications at independent local area networks.

In one embodiment, the intelligent switch 24 may be provided as part of a managed service/CPE (customer premise equipment) bundle to any number of networks desiring to outsource these types of network functions. These subscriber networks would then have content analysis functions, such as content filtering, anti-virus protection and intrusion detection, managed by a third party managed service entity. As shown in FIG. 4, an example of a managed service provider network 48 is shown. In this embodiment, the managed service provider network 48 contains one or more policy management servers 50. The content analysis applications contained in the one or more separate content analysis management servers 50 at the managed service provider network 48 may include one or more versions of content filtering, anti-virus, and intrusion detection applications for use at the intelligent switches 24 in separate subscriber networks 52, 54 subscribing to the managed service or services.

The intelligent switches in the subscriber networks 52, 54 are preferably intelligent switches such as described above with reference to FIG. 3, however other configurations of intelligent switches, for example having different combinations of ports sharing processor services, are also contemplated. The policy management server 50 or servers in the provider network can activate, update or manage specific services at each of the intelligent switches remotely. The connection between the provider network 48 and intelligent switches 24 in the respective subscriber networks 52, 54 may be through VPN (virtual private network) tunnels 56, 58 established through the Internet 60. For purposes of clarity, the managed service provider network 48 and subscriber networks 52, 54 are shown without specific details as to individual devices in each network other than the policy management and billing servers in the managed service provider network and the intelligent switches 24 which can remotely communicate with the managed service provider network. The policy management server or servers 50 may be any of a number of known server platforms such as UNIX-based, Linux-based and X86-based servers. As will be understood, various additional devices may or may not be included in each of the networks, such as routers, gateway devices, work stations, servers, and other network specific devices or configurations.

Network administrators for the subscriber networks 52, 54 may configure levels of management by the managed service provider network through a customer web portal over a secure Internet link. Performance of specific functions subscribed to by the subscriber networks may be monitored by system administrators via standard management interfaces with the managed service provider network. The management interfaces will show system performance metrics relevant to the services subscribed to by the particular subscriber network. For example, the number of intercepted viruses, the types of viruses, and the sources of attempted intrusion by the network administrator may be obtained through the management interfaces.

Suitable performance monitoring mechanisms that may be installed on the content analysis management server 44 and accessible through the Internet by network administrators of subscriber networks include HP OpenView available from Hewlett Packard Company of Palo Alto, Calif., Netcool® available from Micromuse, Inc. of San Francisco, Calif., and others. In one embodiment, a subscriber network could order a specific service and the service would be activated remotely from the managed service provider network. The managed service provider network 48 could communicate with the intelligent switch 24 of the appropriate subscriber network 52, 54 via key codes that would activate the requested service for the specifically requested intelligent switch ports in the intelligent switch.

The method and system described herein may be used to implement content analysis over one or more network layers. Referring to the International Standards Organization (ISO) 7-layer Open Systems Interconnection (OSI) reference model, the managed service network could be used to perform layer 7 (application layer) filtering such as anti-virus control. IP address and port filtering, which are considered portions of layers 3 and 4 (network and transport layers, respectively) may also be implicated using anti-virus functions. Also, MAC (Media Access Control) address filtering or controls would be considered part of layer 2 (data link layer). Accordingly, applications such as content filtering and anti-virus control implicate multiple network layers. Although specific OSI layers are mentioned above, any of the OSI layers may also be manipulated and monitored using the managed service system and intelligent switch described above.

Figure 5:
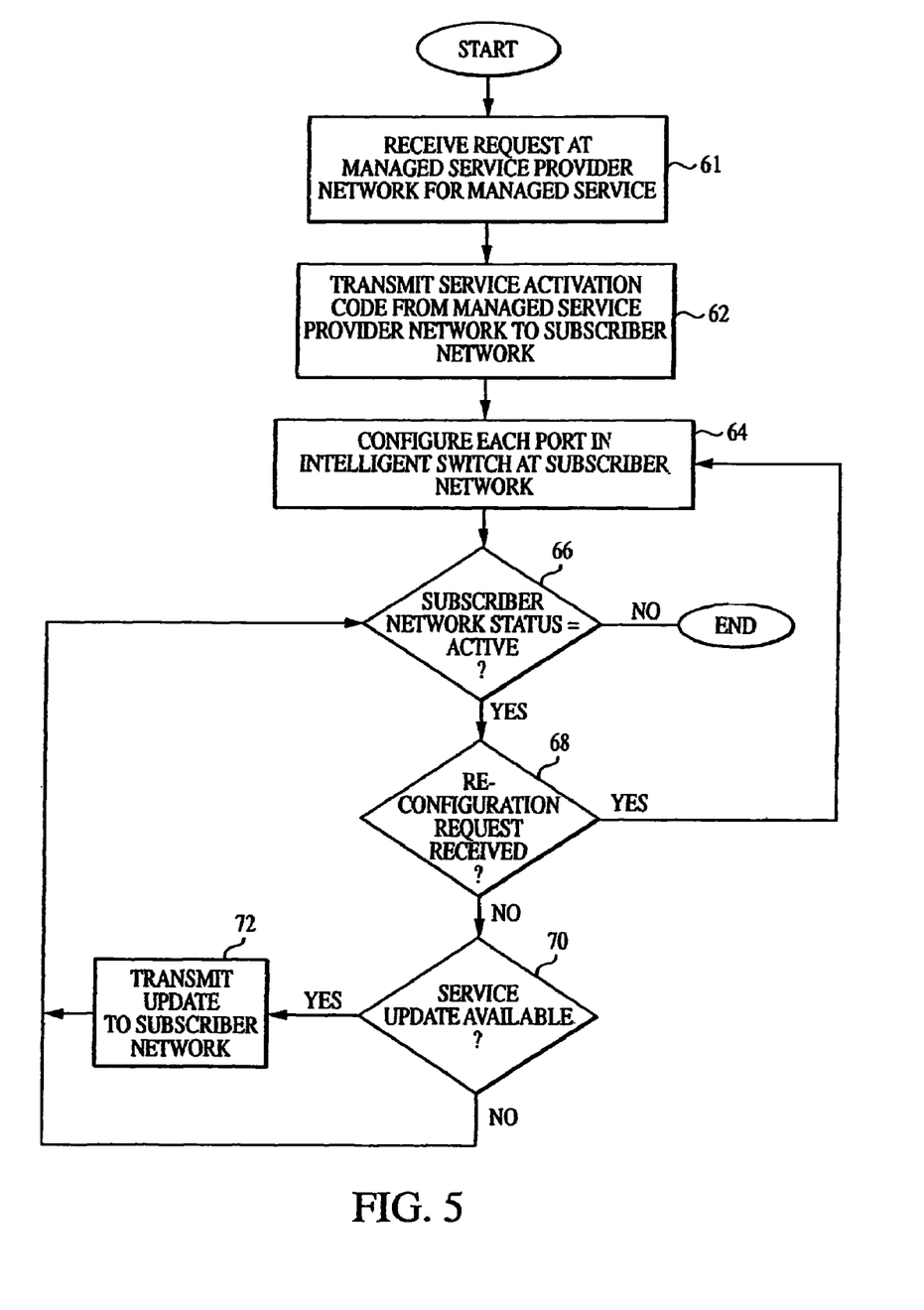
FIG. 5 is a flow diagram of an embodiment of remote policy control and software updates via a content filtering/anti-virus appliance from a management service provider network.

Utilizing the systems described above, one embodiment of a method for managing content analysis and filtering from a remotely managed service provider network is shown in FIG. 5. A subscriber network signing up for one or more services from the managed service provider network 48 may initially receive an intelligent switch 24 with its application buffer administration interface already containing preloaded content analysis applications. After the intelligent switch or intelligent switches have been installed at the subscriber network, the subscriber network administrator may then access the managed service provider network to request one or more managed services such as content filtering or anti-virus protection (at 61). Upon receipt of the managed service request from the subscriber network, the one or more services from the one or more policy management servers 50 within the managed service provider network 48 will transmit a service activation code in a transmission addressed to the intelligent switch of the subscriber network (at 62). The activation code may be transmitted in an encrypted signal, through a secure channel such as a VPN tunnel 56, 58 between the policy management server of the provider network and the intelligent switch of the subscriber network, or via any of a number of other known secure transmission mechanisms.

In addition to activating the service generally at the subscriber's intelligent switch, the managed service provider network 48 may remotely configure each port in the intelligent switch at the subscriber network (at 64). The configuration criteria may range from simply enabling or disabling the service for each particular intelligent switch, or it may include more detailed parameters to tailor the extent to which the service is enabled on a port-to-port basis. In one embodiment, the content analysis management server may be linked to a backend billing server 51 (see FIG. 4) in the service provider network. The billing server can keep track of charges for content analysis services subscribed to by the various subscriber networks. The billing server may include information on service start and stop times for each subscriber network, the number of ports at each intelligent switch, and how each switch is individually configured. In this way, a subscriber may be billed on a per port basis for the specific configuration of service set up on each individual port.

Following the initial set up and configuration of the services for each port in a subscriber network intelligent switch, the services may be reconfigured or updated at any time through transmission from the policy management server 50 to the intelligent switch 24 in the appropriate network. As long as the subscriber network maintains an active status with the managed service provider network, the managed service provider network 48 will provide web portal or other automated access for subscriber network administrators to change the configuration of ports and services in their network. The managed service provider network will detect whether there is a reconfiguration request and, if so, automatically configure each port 26 at the intelligent switch according to the reconfiguration request (at 66, 68). In addition to responding at the managed service provider network to reconfiguration requests entered by system administrators for subscribing networks, the managed service provider network will automatically update service application software as service updates become available by transmitting these updates to the intelligent switch or intelligent switches in the various subscriber networks (at 70, 72). The service update function may execute automatically or may provide updates for which the subscriber network system administrators may manually accept or reject.

Figure 6:
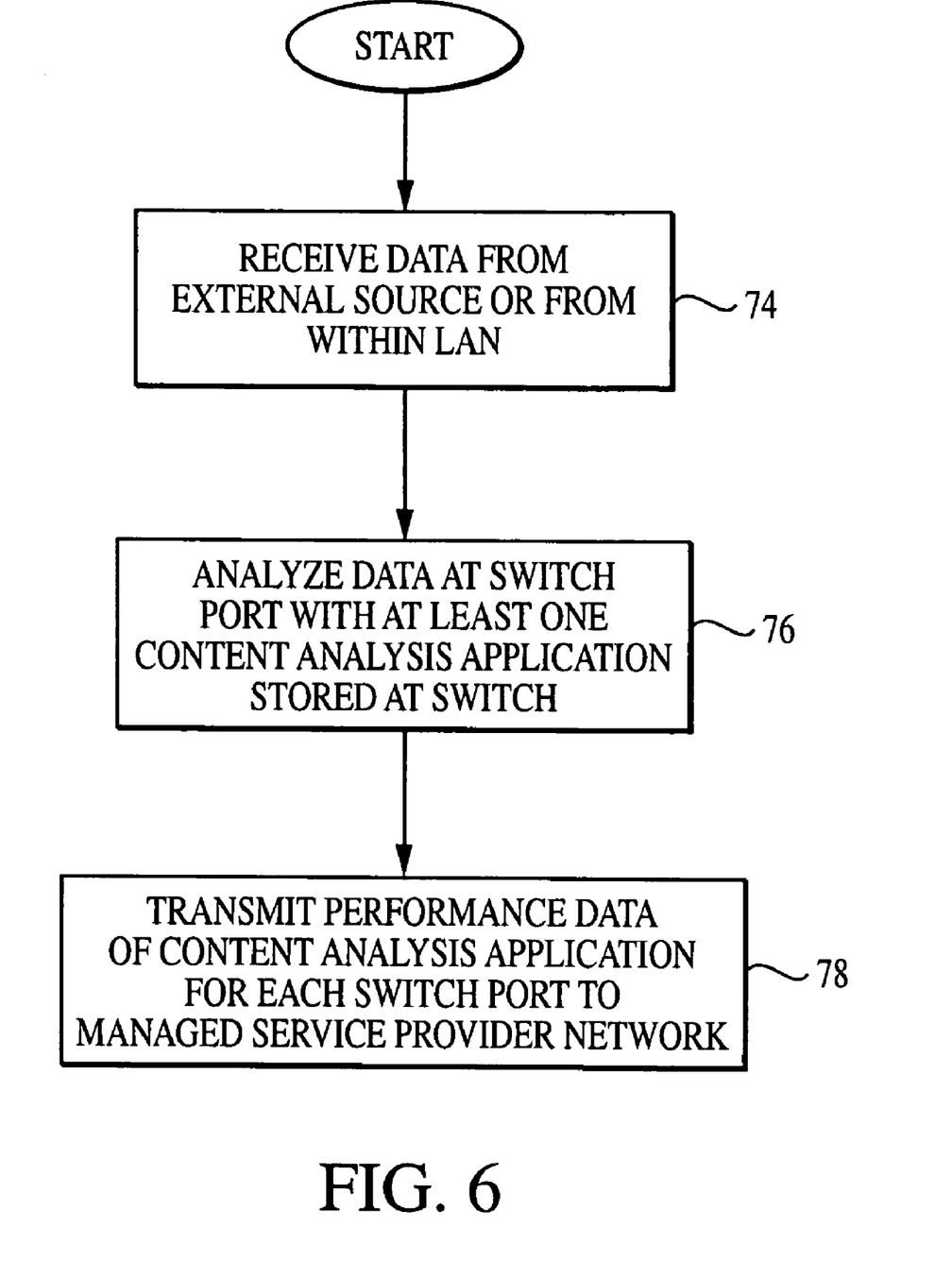
FIG. 6 is a flow diagram of an embodiment of anti-virus or content filtering within a LAN.

After the services subscribed to have been activated at the intelligent switch and the appropriate ports configured according to requests of the administrator of the subscriber network, scanning will take place at the intelligent switch or intelligent switches 24 according to the services activated at the port. The content analysis scanning will take place independently at each port, so information arriving at each port will be analyzed in substantially real-time. As illustrated in FIG. 6, each intelligent switch can receive unanalyzed data from an external source or data from within the local network. Typically, a router or other network device in a local area network will receive unanalyzed data from the external network and pass the unanalyzed data to the intelligent switch for processing. The intelligent switch in the subscribing network will analyze data on a port-by-port basis with at least one of the data analysis applications stored at the intelligent switch (at 74, 76). The analyzed data will then be forwarded on from the port of the intelligent switch to the appropriate destination device in the subscriber network.

The scanning at each port could be implemented on multiple different levels with mechanisms such as white/black lists that identify, for example, what is an acceptable URL (universal resource locator), intelligent search mechanisms, specific virus definitions and so on. In one embodiment, the unanalyzed data may be formatted as packet data and the communications protocol may be TCP/IP. Other types of packetized and non-packetized data communications are also contemplated. The application of the content analysis services selected for a particular port may be executed at the ingress side of the intelligent switch, where information is analyzed as it is received from a device connected to the port and before transmission along the backplane of the intelligent switch to a destination port, or on the egress side of the intelligent switch, where data received from the backplane of the intelligent switch is analyzed and manipulated as it passes from the intelligent switch to the destination device in the network from the intelligent switch. Any of a number of known content analysis programs and applications, such as those available from Enterasys Networks, Inc. of Andover, Mass. and Network Associates, Inc. of Santa Clara, Calif., maintained at the intelligent switch by the managed service provider network may be executed in this fashion.

The intelligent switch will transmit performance data of the content analysis services for each port to the managed service provider network (at 78). In one embodiment, this may be accomplished by configuring the intelligent switch to transmit performance data at regular intervals to the managed service provider network so that a subscriber network administrator may receive updated information as to performance when that administrator contacts the managed service provider through the web portal interface. Alternatively, upon receipt of a web portal inquiry from the subscriber network administrator, the managed service provider network can poll the appropriate intelligent switch for the latest data which would be cached at the intelligent switch. In yet another embodiment, each and every performance related action at each port of the intelligent switch may be transmitted in substantially real time to the managed service provider network.

It is intended that the foregoing detailed description be regarded as illustrative rather than limiting and that it be understood that the following claims, including all equivalence, are intended to describe the scope of the invention.

The invention claimed is:

1. A method for analyzing data content received at a local area network from an external communications network, wherein the method comprises:
   receiving unanalyzed content at a local area network;
   passing the unanalyzed content to a switch in the local area network;
   analyzing the unanalyzed content at the switch and generating analyzed data; and
   routing the analyzed data to a device in the local area network in communication with the switch, wherein the switch comprises a plurality of ports, and wherein analyzing the unanalyzed content at the switch comprises the switch scanning the plurality of ports and applying a content analysis algorithm to each of the plurality of ports,
   wherein applying the content analysis algorithm comprises applying a first content analysis algorithm to a first port of the plurality of ports and applying a second content analysis algorithm to a second port of the plurality of ports, wherein the second content analysis algorithm is different than the first content analysis algorithm.

2. The method of claim 1, wherein the step of analyzing the unanalyzed content comprises applying a content filtering algorithm to the unanalyzed content upon ingress at one of the plurality of ports.

3. The method of claim 1, wherein the step of analyzing the unanalyzed content comprises applying a content filtering algorithm to the unanalyzed content upon egress at one of the plurality of ports.

4. The method of claim 1 wherein the unanalyzed content is formatted in data packets.

5. The method of claim 4, wherein analyzing the unanalyzed content at the switch comprises the switch applying the content analysis algorithm to each data packet of unanalyzed content.

6. The method of claim 5, wherein the switch applying the content analysis algorithm comprises the switch executing an anti-virus algorithm.

7. The method of claim 5, wherein the switch applying the content analysis algorithm comprises the switch executing an intrusion detection algorithm.

8. The method of claim 1, wherein each of the plurality of ports comprises a dedicated processor and each dedicated processor for a respective port independently applies a separate content analysis algorithm to unanalyzed content at the port, whereby each of the plurality of ports analyzes content with its respective.

9. The method of claim 1, further comprising receiving a content analysis software update at the switch from a managed service provider network via the external communications network.

10. The method of claim 9, further comprising applying the content analysis software update to each of the plurality of ports at the switch configured to implement content analysis software contained in the content analysis software update.

11. A method of managing content analysis for a local area network from a managed service provider network, wherein the local area network comprises a switch in communication with an external communications network and at least one device in communication with the switch, wherein the method comprises:
establishing a communication link between the switch of the local area network and the managed service provider network via the external communications network;
transmitting port configuration instructions from the managed service provider network to the switch of the local area network, the port configuration instructions comprising instructions to configure a plurality of ports on a port-to-port basis at the switch to implement at least two content analysis functions and to cause the switch to scan and apply a first content analysis function to a first selected port of the plurality of ports and scan and apply a second content analysis function to a second selected port of the plurality of ports, wherein the second content analysis function is different than the first content analysis function.

12. The method of claim 11, further comprising:
receiving a content analysis software update at the managed service provider network;
transmitting the content analysis software update to the switch and updating content analysis software at the switch with the content analysis software update.

13. The method of claim 11, further comprising monitoring content analysis activity at the switch from the managed service provider network.

14. A method of providing content analysis policy to a plurality of networks, the method comprising:
establishing a communication link between a switch in each of a plurality of subscriber networks and an application management appliance of a managed service provider network via an external communications network;
transmitting one of instructions or update information for a content analysis application from the application management appliance to the switch in each of the plurality of subscriber networks, the content analysis application comprising a first content analysis application and a second content analysis application, wherein the switch in each of the plurality of subscriber networks comprises a plurality of ports; and
applying the first content analysis application to a first port of the plurality of ports and applying the second content analysis application to a second port of the plurality of ports, wherein the second content analysis application is different than the first content analysis application; and
receiving performance metrics of the first and second different content analysis applications from each of the plurality of subscriber networks, and wherein receiving performance metrics comprises receiving performance metrics for each of the plurality of ports in substantially real time.

15. A local area network switch system having content analysis capabilities comprising:
a billing server;
a plurality of ports in communication with the billing sewer, each of the plurality of ports configured for communication with a respective external device, and each of the plurality of ports comprising:
an interface connection adapted for connecting with a communication line of an external device;
a processor in communication with the interface connection;
a memory in communication with the processor;
an application buffer in communication with the processor and the memory, wherein the application buffer contains logic operative on the processor to analyze a content of information passing between the external device and the port; and
a communication bus in communication with each of the plurality of ports, the communication bus adapted to carry information between the plurality of ports,
wherein a first application buffer contains logic for applying a first content analysis algorithm to a first port of the plurality of ports and a second application buffer contains logic for applying a second content analysis algorithm to a second port of the plurality of ports, wherein the second content analysis algorithm is different than the first content analysis algorithm,
wherein the billing server is operable to track charges for content analysis services and bill on a per port basis.

16. The apparatus of claim 15 further comprising an application buffer administrative interface in communication with the communication bus, wherein the application buffer administrative interface comprises content analysis resources accessible by the application buffer for each of the plurality of ports.

17. The apparatus of claim 15, wherein at least one of the application buffers comprises anti-virus filtering logic.

18. The apparatus of claim 15, wherein at least one of the application buffers comprises network security logic.

19. The apparatus of claim 15, wherein at least one of the application buffers comprises content filtering logic.

20. The apparatus of claim 16, wherein the application buffer administrative interface comprises anti-virus definitions adapted for use by anti-virus logic stored on an application buffer at each of the plurality of ports.

21. A method for analyzing data content received at a local area network from an external communications network, wherein the method comprises:
receiving at a local area network unanalyzed data content in a data field of a data packet formatted according to a communications protocol;
passing the unanalyzed data content to a switch in the local area network;
analyzing the unanalyzed data content at the switch and generating analyzed data; and
routing the analyzed data to a device in the local area network in communication with the switch, wherein the switch comprises a plurality of ports, and wherein analyzing the unanalyzed content at the switch comprises the switch scanning the plurality of ports and applying a content analysis algorithm to each of the plurality of ports,
wherein applying the content analysis algorithm comprises applying a first content analysis algorithm to a first port of the plurality of ports and applying a second content analysis algorithm to a second port of the plurality of ports, wherein the second content analysis algorithm is different than the first content analysis algorithm.

22. The method of claim 21, wherein the first content analysis algorithm comprises a first data content analysis algorithm, and wherein the second content analysis algorithm comprises a second data content analysis algorithm.

23. A method for analyzing data content received at a local area network from an external communications network, wherein the method comprises:
   receiving at a local area network unanalyzed data content in a data field of a data packet formatted according to a communications protocol;
   passing the unanalyzed data content to a switch in the local area network;
   analyzing the unanalyzed data content at the switch and generating analyzed data; and
   routing the analyzed data to a device in the local area network in communication with the switch, wherein the switch comprises a plurality of ports, and wherein analyzing the unanalyzed data content at the switch comprises the switch scanning the plurality of ports and applying a data content analysis algorithm to each of the plurality of ports,
wherein applying the data content analysis algorithm comprises applying a first data content analysis algorithm to unanalyzed data content at a first port of the plurality of ports and applying a second data content analysis algorithm to unanalyzed data content at a second port of the plurality of ports, wherein the second data content analysis algorithm is different than the first data content analysis algorithm.

* * * * *